United States Patent
Lehmann et al.

(10) Patent No.: US 7,005,481 B1
(45) Date of Patent: Feb. 28, 2006

(54) PROCESS FOR THE CONDENSATION OF POLYAMIDES

(75) Inventors: Dieter Lehmann, Coswig (DE); Klaus Titzschkau, Wustenrot (DE)

(73) Assignee: L. Brueggemann KG Sprit-und Chemische Fabrik, Heilbronn (DE)

( * ) Notice: Subject to any disclaimer, the term of this patent is extended or adjusted under 35 U.S.C. 154(b) by 0 days.

(21) Appl. No.: 10/018,597

(22) PCT Filed: Apr. 26, 2000

(86) PCT No.: PCT/EP00/03757

§ 371 (c)(1),
(2), (4) Date: Jun. 11, 2002

(87) PCT Pub. No.: WO00/66650

PCT Pub. Date: Nov. 9, 2000

(30) Foreign Application Priority Data

May 3, 1999 (DE) .................................. 199 20 336

(51) Int. Cl.
*C08G 63/44* (2006.01)
*C08G 69/00* (2006.01)
*C08G 69/02* (2006.01)
*C08F 283/04* (2006.01)

(52) U.S. Cl. ..................................... 525/433; 525/420
(58) Field of Classification Search ................ 525/420, 525/433
See application file for complete search history.

(56) References Cited

U.S. PATENT DOCUMENTS

| 5,760,143 | A | * | 6/1998 | Kubo et al. | ................. | 525/425 |
| 6,767,988 | B1 | * | 7/2004 | Okushita et al. | ............ | 528/310 |

FOREIGN PATENT DOCUMENTS

| EP | 0 285 692 A1 | | 10/1988 |
| EP | 0377259 | * | 11/1990 |
| EP | 0 415 069 A2 | | 3/1991 |
| EP | 0837 088 A1 | | 4/1998 |
| JP | 1-252640 | * | 10/1989 |
| JP | 01 252640 A | | 10/1989 |
| JP | 03 237155 A | | 10/1991 |
| JP | 05 78559 A | | 3/1993 |
| JP | 05 078561 A | | 3/1993 |

* cited by examiner

*Primary Examiner*—Ana Woodward
(74) *Attorney, Agent, or Firm*—Scully, Scott, Murphy & Presser

(57) ABSTRACT

The present invention relates to a process for the condensation of polyamides using an additive having carbonate units. This ensures a safe and fast condensation reaction.

18 Claims, No Drawings

PROCESS FOR THE CONDENSATION OF POLYAMIDES

The present invention relates to an additive for the condensation of oligo- and/or polyamides, its use for the condensation of oligo- and/or polyamides, and to a process for the condensation of oligo- and/or polyamides.

Polyamides are macromolecules, which comprise the element —CO—NH— in their main chain. They may be prepared either from two different bifunctional monomer units, of which each comprises two identical functional groups, such as —$NH_2$ or —COOH, or from identical bifunctional monomer units each carrying or being capable of forming one amino and one carboxyl group. The main representatives are polyamide 6.6 and polyamide 6. The monomer units may be varied within a broad range (A. Echte, Handbuch der technischen Polymerchemie). Polyamides are for example prepared by polycondensation reactions or by ring opening polymerisation of lactames. The molecular mass of the polyamides strongly depends from the reaction conditions. Since the technical properties of polyamides depend on the one hand from the method of preparation, i.e. molecular mass and monomer content, oligomer content and terminal amino groups, and on the other hand from the processing, i.e. degree of crystallisation and water content, high requirements are requested with respect to the method of preparation, in order to obtain specific polyamides with constant quality. In particular concerning injection molding it is important to exclude solid impurities and gel particles. Of further importance is a suitable storage under moisture and air exclusion.

It is therefore common to separate the preparation of polyamides into two separate process steps. First a so-called precondensate is prepared which will be modified by the end users as appropriate in a second step, for example by condensation under admixture of additives, in order to obtain the desired properties of the final product. Such a two-step procedure is in particular favourable since, depending upon the type of processing, the desired processing properties may be tailored. Polyamides for example which are to be used for injection molding should show a higher melt flow index (MFI) than polyamides to be used as thermoplastic extrusion materials. Extrusion materials commonly dd have higher molecular masses and, due thereto a higher melt viscosity and i.e. a lower melt index, compared with injection molding materials of the same material. Higher melt viscosities and lower melt indices ensure a better dimensional stability once the material has left the nozzle upon extrusion. Higher relative molecular masses, higher melt viscosities and lower melt indices are furthermore connected with improved mechanical properties. Processing using injection molding however is more complicated.

There exist a couple of methods for the condensation of oligo- and (co-)polyamides in order to obtain desired properties.

DE-A-4136082, DE-A-4136083, DE-A-4136081, DE-A-4136078 and DE-A-4136079 for example disclose methods for the preparation of rapid condensation polyamides. As additives for the rapid condensation diisocyanates, blocked diisocyanates or oligo- or polyurethanes are used. A further example for the adjustment of the viscosity of polyamide melts is disclosed in EP-A-408957. In order to increase the viscosity of lactame melts specific (co-)polyamides which must be soluble in the lactame melt are used. M.Xanthos furthermore describes in Reactive Extrusion, Principles and Practice, Hanser, München (1992) the use of epoxy compounds for the condensation of polyamides.

Furthermore the reactive blending of polyamides with polycarbonates is known. A. Valenza et al. Disclose in Intern. Polymer Processing IX 3 (1994) that polyamide 6, under certain conditions, may be reacted with polycarbonates. By chemical reactions the initially non compatible polymers yield block copolymers, which increases for example the solvent resistance of the polycarbonates. However, reactions are achieved only if a high ratio of $NH_2$-terminals is present in the polyamide. Polyamides with COOH-terminals do not react, according to the disclosure of this document.

Finally, Ciba-Geigy offers an additive for the stabilization of polyamides during recycling (EB 35-50). However the available product information itself shows, that the melt index of the stabilized polyamides increases upon multiple processing, i.e. multiple extrusion operations are not possible.

The methods described in the prior art do show different drawbacks. The use of diisocyanates, in the free form or blocked is disadvantageous in view of the high toxicity of the free compounds which require particular protective means during use. Furthermore the measuring out into production equipment often is difficult. Furthermore these compounds do show such a high reactivity that very rapid reactions occur, involving gel formation and cross-linking reactions, which leads to unwanted variations in the product quality and inhomogeneities in the final product. This may give raise to problems during spinning operations.

The addition of the (co-)polyamides is furthermore limited to the lactame melts named in the above described European patent application. This addition furthermore leads to an increase of the costs of the final product since a great amount of additive must be added.

Overall the modified polyamides of the prior art do not show stable processing properties during further manufacturing steps, i.e. multiple extrusion processes is only possible with a simultaneous deterioration of mechanical properties. This is for many applications not acceptable. The polymer waste during spinning operations for example often consists of the pure polymer but can only be reused with modifications. The additives described in the prior art furthermore often react with other additives present, such as stabilizers or processing aids, which often leads to side reactions and undesired discolorations. This increases the expensive need of further use of additives.

It is therefore the object of the present invention to overcome the problems associated with the prior art and to provide a process for the condensation of oligo- and/or (co-)polyamides which enables the stable and safe adjustment of desired properties of polyamides and furthermore also the possibility of multiple processing of the condensation product.

This object is solved with the process for the condensation of oligo- and/or (co-)polyamides, characterized in that as additive a compound with at least two carbonate units is used.

The process according to the present invention enables the condensation of oligo- and/or (co-)polyamides without gel formation and production of inhomogeneities. The additive used in accordance with the present invention furthermore is not toxic or at least less toxic than the diisocyanates and epoxy compounds used so far. Multiple processing steps are possible with the obtained condensation product, in dry as well as in wet form, without decrease of the important characterizing mechanical properties.

The present invention furthermore provides the use of at least one compound having at least two carbonate units for the condensation of oligo- and/or (co-)polyamides.

In addition the present invention provides an additive for the condensation of oligo- and/or (co-)polyamides.

In the following the present invention is describes in detail. The term condensation is employed synonym with the term modification in the present invention. All ratios, if not defined otherwise, relate to the weight, all molecular weights relate to the weight average molecular weight.

The process for the condensation of condensation of oligo- and/or (co-)polyamides may employ all types of polyamides. Illustrative examples are PA 6, PA 11, PA 12, PA 6.6, PA 6.10, PA 6.11, PA 6.12, PA 6.6/6, PA 4.6, PA 6-T, PA 6.6-T, Trogamide (Creanova), partially aromatic polyamides and the corresponding copolyamides, blends of polyamides and thermoplastic processable aramides. Usable in accordance with the present invention are furthermore block copolymers of polyamide and polyether, which, due to their interesting mechanical properties, are employed in various fields as thermoplastic elastomers.

Preferably the starting materials for the condensation process do show a molecular weight of more than 5000, in particular of more than 10000. Preferably the oligo- and/or (co-)polyamides to be used in the condensation process are oligo- and/or (co-)polyamides which do have partially remaining amino groups. These may be present as terminal groups but also as side groups.

The compound having at least two carbonate units is employed in the process according to the present invention in a ratio of from 0.005 to 10 weight-%, calculated on the basis of the ratio of the carbonate units to the used oligo- and/or (co-)polyamide. Preferably the above named ratio lies in the area of from 0.01 to 5 weight-%, in particular in the area of from 0.5 to 3 weight-%.

The additive used in the process for the condensation of oligo- and/or (co-)polyamides according to the present invention is at least one compound having at least two carbonate units. This compound may be of low, medium (oligomer) or high (polymer) molecular weight. This compound may consist entirely of carbonate units or it may comprise further units. These may be preferably oligo- or polyamide, oligo- or polyester, oligo- or polyether, oligo- or polyetheresteramide or oligo- or polyesteramide units. These compounds may be prepared with known oligomerisation or polymerisation reactions or by polymer analogous reactions. The knowledge therefor are known to the skilled person from the prior art.

If the compound having at least two carbonate units consists entirely of carbonate units, these are preferably selected among units on the basis of compounds of the formula

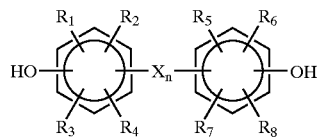

Wherein n is 0 or 1; X is —O—, —S—, —S—S—, —SO—, —SO$_2$—, —SO$_2$—NR$_{12}$—, —CO—, —CO—O—, —CO—NH—, —CH$_2$—, —C(CH$_3$)$_2$—, —NR$_9$—, —C(CF$_3$)$_2$— or —CR$_{10}$R$_{11}$—; R$_1$ to R$_8$ are selected independently among H, alkyl, or halogen; R$_9$ is H, alkyl or acyl; R$_{10}$ and R$_{11}$ may be connected to form a ring; and R$_{12}$ is alkyl or acyl.

The alkyl group preferably is a group having from one to six carbon atoms, in particular from 1 to 3 carbon atoms. These group may be optionally substituted. Preferred examples of substituents are halogens (Cl, Br, F, I) and alkoxy groups having from 1 to 3 carbon atoms.

The acyl group (—COR) is preferably an acyl group in which R is H, alkyl with from 1 to 5 carbon atoms or aryl. The aryl group is preferably an aryl group having from 6 to 24 carbon atoms. This group may optionally be substituted. Preferably the aryl group is a phenyl group. R is in particular preferably alkyl having from 1 to 3 carbon atoms. The ring formed by R$_{10}$ and R$_{11}$ may be a saturated or unsaturated ring with or without a heteroatom. Preferably the ring is a 3- to 12-membered ring, in particular a 5- to 8-membered ring. Further preferably this ring is a saturated ring without heteroatom. In particular preferred is a 6-membered ring.

Further preferred are carbonate units on the basis of dioxydiphenylalkanes, such as bisphenol A, bisphenol B, bisphenol F, halogenated biphenols, such as 3,3',5,5'-tetrachloro- or 3,3',5,5'-tetrabromo-bisphenol A, or alkylated bisphenols, such as 3,3',5,5'-tetramethyl-bisphenol A. In particular preferred are carbonate units on the basis of bisphenol A and bisphenol F.

These compounds have preferably a molecular weight of less than 50000, preferably of from 1000 to 30000 and in particular preferably of from 5000 to 20000.

If the compound having at least two carbonate units comprises further components, defined as above, these are preferably selected among the following:

Amide units: amide units derived from PA 6, PA 11, PA 12, PA 6.6, PA 6.10, PA 6.11, PA 6.12, PA 6.6/6, PA 4.6, PA 6-T, PA 6.6-T, trogamides (creanova), partially aromatic amides and the corresponding copolyamides, blends of polyamides and thermoplastic processable aramides. Preferred are amide units derived from PA 6 and PA 6.6.

Ester units: ester units, derived from aliphatic, aromatic or mixed aliphatic/aromatic polyesters, such as PET, PBT, PDCT, PCL, PHB, poly lactic acid, polytetramethylene adipate, poly-4-hydroxy benzoic acid and polycondensates of bisphenol A and phthalic acids. Preferred are ester units on the basis of mixed aliphatic/aromatic polyesters.

Ether units: ether units, derived from polyethers such as polyalkyleneglycols (PEG, PPG, polyepichlorhydrine), epoxy resins, polytetrahydrofuranes, polyoxetanes, polyphenylethers, polyarylethers (poly(oxy-2,6-dimethyl-p-phenylene), poly(oxy-2,6-diphenyl-p-phenylene) or polyetheretherketones. Preferred are ether units derived from polyalkyleneglycoles.

Esteramide and etheresteramide units: derived from the above named amide, ester and ether units.

If the compound having at least two carbonate units comprises such units, these are preferably present in the form of blocks. These blocks preferably have a molecular weight of less than 50000, more preferably of from 30000 to 1000 and in particular preferably of from 5000 to 20000.

Preferably the additive employed in accordance with the present invention is a block copolymer of the AB-type or A[BA]$_{n \geq 1}$-type. Therein A represents a carbonate block and B represents a non-carbonate block. It is preferred to use as block B an oligo- or polyamide block and/or an oligo- or polyester block and/or an oligo- or polyether block and/or an oligo- or polyetheresteramide block and/or an oligo- or polyesteramide block or blends or (block-)copolymers thereof. Examples and preferred embodiments thereof are described above. Preferably n in this formula is from 1 to 3.

The ratio A to B is preferably of from 99:1 to 5:95, more preferably of from 95:5 to 20:80, based on the weight. The block B which does not consist of carbonate units preferably has a molecular weight of less than 50000, more preferably of from 30000 to 1000 and in particular preferably of from 20000 to 5000.

In particular preferably the block B is an oligo- or polyamide block, preferably derived from polyamide 6, and preferably has a molecular weight of from 20000 to 10000.

The carbonate block A comprises, in accordance with the present invention at least two carbonate units, which may be aliphatic, aromatic or aliphatic/aromatic.

Preferably this block has a molecular weight of less than 50000, more preferably of from 1000 to 30000 and in particular preferably of from 5000 to 20000. In accordance with the present invention these blocks may comprise only one type of carbonate units or more than only one type of carbonate units, such as for example units on the basis of compounds of the formula

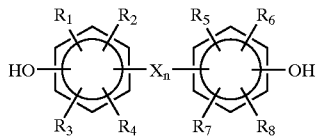

Wherein n is 0 or 1; X is —O—, —S—, —S—S—, —SO—, —SO$_2$—, —SO$_2$—NR$_{12}$—, —CO—, —CO—O—, —CO—NH—, —CH$_2$—, —C(CH$_3$)$_2$—, —NR$_9$—, —C(CF$_3$)$_2$— or —CR$_{10}$R$_{11}$—; R$_1$ to R$_8$ are selected independently among H, alkyl, or halogen; R$_9$ is H, alkyl or acyl; R$_{10}$ and R$_{11}$ may be connected to form a ring; and R$_{12}$ is alkyl or acyl.

The alkyl group preferably is a group having from one to six carbon atoms, in particular from 1 to 3 carbon atoms. These group may be optionally substituted. Preferred examples of substituents are halogens (Cl, Br, F, I) and alkoxy groups having from 1 to 3 carbon atoms.

The acyl group (—COR) is preferably an acyl group in which R is H, alkyl with from 1 to 5 carbon atoms or aryl. The aryl group is preferably an aryl group having from 6 to 24 carbon atoms. This group may optionally be substituted. Preferably the aryl group is a phenyl group. R is in particular preferably alkyl having from 1 to 3 carbon atoms. The ring formed by R$_{10}$ and R$_{11}$, may be a saturated or unsaturated ring with or without a heteroatom. Preferably the ring is a 3- to 12-membered ring, in particular a 5- to 8-membered ring. Further preferably this ring is a saturated ring without heteroatom. In particular preferred is a C$_6$ ring. The aryl group preferably is an aryl group having from 6 to 24 carbon atoms, which may be optionally substituted. The aryl group preferably is a phenyl group.

Further preferred are carbonate units on the basis of dioxydiphenylalkanes, such as bisphenol A, bisphenol B, bisphenol F, halogenated biphenols, such as 3,3'5,5'-tetrachloro- or 3,3',5,5'-tetrabromo-bisphenol A, or alkylated bisphenols, such as 3,3',5,5'-tetramethyl-bisphenol A. In particular preferred are carbonate units on the basis of bisphenol A and bisphenol F.

The compound having at least two carbonate units preferably has a melt index comparable or higher than the melt index of the oligo- and/or (co-)polyamides to be condensated. This enables a good and even distribution of the compound having at least two carbonate units within the melt. Preferably the compound having at least two carbonate units has a melt index in the range of from 10 to 350, more preferably in the range of from 20 to 300, measured under comparable measurement conditions of for example 240° C., 2.16 kg for polyamide 6.

It is furthermore possible to employ common additives in the process according to the present invention, additives which are usually employed in the production of polyamide products. Illustrative examples thereof are colorants, flame retardants, flameproofing agents, stabilizers, fillers, slip improvers, release agents, impact strength modifiers, crystallization accelerators, antistatic agents, lubricants, processing aids and further polymers, which are usually compounded with polyamides.

Examples of these further additives are as follows.

Colorants: titan oxide, lead white, zinc white, liptone, antimony White, carbon black, iron oxide black, manganese black, cobalt black, antimony black, lead chromate, red lead, zinc yellow, zinc green, cadmium yellow, cadmium red, cobalt blue, Berlin blue, ultramarine, manganese violet, Schweinfurt green, molybdenum orange and red, chromium orange and red, iron oxide red, chromium oxide green, strontium yellow, molybdenum blue, chalk, ochre, umbra, green soil, Terra di Siena (burned) and graphite.

Flame retardants and flameproofing agents: antimony trioxide, hexabromocyclododecane, tetrachloro- or tetrabromobisophenol and halogenated phosphates, borates, chloroparaffine and red phosphorus.

Stabilizers: metal salts, in particular copper salts and molybdenum salts, copper complexes.

Fillers: glass fibers, glass beads, kieselguhr, kaoline, talcum, clay, CaF$_2$, CaCO$_3$ and aluminum oxide.

Slip improvers and lubricants: MoS$_2$, paraffin, fatty alcohols, stearates, fatty acid amides.

Release agents and processing aids: wax (montanates), montanate acid wax, montanate ester wax, polysiloxanes, stearates, polyvinylalcohol, SiO$_2$, calcium silicates.

Impact Strength Modifiers: Polybutadiene, EPM, EPDM, HDPE

Antistatic agents: carbon black multivalent alcohols, fatty acid esters, amines, acid amides quartenery ammonium salts.

These further additives may be employed in amounts known to the skilled person.

The product obtained with the condensation process according to the present invention may either be stored in the form of a granulate until the final processing or it may be directly processed to the desired final products. Since the obtained granulate may be processed further by extrusion without decrease of the characteristic values for mechanical properties a storage before the final use is not detrimental. The direct processing in order to obtain the desired products and the processing after storage may be carried out using usual devices known to the person skilled in the art, described for example in A. Echte, Handbuch der technischen Polymerchemie, VCH-Verlagsgesellschaft mbH, Weinheim, 1993, or Polymere Werkstoffe, edited by H. Batzer, Georg Thieme Verlag, Stuttgart, 1984, or Ullmanns Encyklopädie der technischen Chemie, Volume 15, Verlag Chemie, Weinheim, 1978.

The polyamides, obtained with the condensation according to the present invention, do show, in particular if polyamide 6 is concerned, surprisingly improved values for the impact strength. At the same time a repeated extrusion, for example with waste material obtained during fiber spinning, is possible without a new addition of additive, without decrease of the characteristic values for the mechanical properties. Neither the tensile strength, nor the bending strength, the tensile stretch or the E-module are influenced adversely.

Since the properties of the condensation product polyamide may be influenced and adjusted over a wide range with the adjustment of the addition rate of the compound having at least two carbonate units and the processing parameters, it is possible to use the obtained polyamides in a wide variety of applications.

For example, the polyamides may be employed for fiber spinning, with the advantage that occurring waste may be recycled without any further workup. Also film blowing and film pressing is possible with the polyamides obtained with the condensation reaction according to the present invention.

It is however also possible to design the process in accordance with the present invention in a manner so that the obtained polyamides may be processed by injection molding, enabling the formation of moldings having very good mechanical properties.

The present invention furthermore enables the formation of pseudoplastic behavior in polyamide melts.

Pseudoplastic behavior (pseudo plasticity, shear reducing of viscosity) is a phenomenon known in the art of rheology, namely the opposite of dilatancy. Pseudoplasticity describes the fact that the viscosity of flowing material is reduced under the influence of increasing shearing force or shear rate. The reduction of the viscosity is based on the fact that the entangled molecules are aligned under the influence of the increasing shearing force (Römpp Chemie Lexikon, $9^{th}$ Ed., Georg Thieme Verlag, Stuttgart, N.Y., 1992).

The broadening of the molecular weight distribution obtained in the condensation process for polyamides according to the present invention gives raise to a pseudoplastic behavior in the melt during processing steps, such as during the production of intermediates and during the production of extrusion profiles as well as during injection molding. With increasing shear rate the melt viscosity is reduced, leading to a reduction of the pressure loss. From the rheological point of view at high shear rates there appears to be no or only a minor difference to not modified polyamides. Therefore usual devices and modifications used for the shaping of products may be employed. After decrease of the shear rate, for example in the device after shaping, the increased melt viscosity is advantageous since a better shaping of polyamide products may be obtained.

The improvement of the mechanical properties enables at the same time a further improvement of the shaping processes.

The great variability furthermore enables the production of polyamides which may be used for deep drawing, profile extrusion, film extrusion and blow forming.

Furthermore the additive compounds according to the present invention in the form of the block copolymers, described here as additives usable in accordance with the present invention, may be used for the compatibilisation of polymer blends. Additives in accordance with the present invention of the block copolymer type, for example the AB-type or the $A[BA]_{n \geq 1}$-type, may be used for the compatibilisation of polymer blends of polymers of type A with polymers of type B. The definitions for the polymers of type A and type B, respectively, are in accordance with the description given above for the additives. All the preferred embodiments of the additive compounds, described in connection with the condensation of polyamides, are preferred also in the present context.

The additive in accordance with the present invention, comprising at least one structural element of formula (I), described in the present application, including all preferred embodiments thereof, is usable for the compatibilisation of polymer blends.

The additive according to formulae (I), (Ia) or (II), wherein a polyamide block is linked with a polycarbonate block, is usable for example for the compatibilisation of polyamide-polycarbonate-blends. The additive in accordance with the present invention not only gives raise to a condensation reaction of the polyamide component but also yields an interface modification of the blend polymers which are, in principle, not compatible. This yields improved properties of the resulting material, such as improved tensile strength under simultaneous improvement of flow properties of the melt (increase of the melt index, preferably for shorter cycle duration during injection molding or for higher through put with extrusion processes). Possible is also the use as hot melt adhesive.

The process in accordance with the present invention is carried out using the usual plastic processing devices, known to the person skilled in the art. These devices are melt mixers and include single screw and double screw extruder, wherein the two screws may rotate in the same or in opposite directions, kneaders, such as Banbury mixer, Buss kneader and planetary roller kneader. Preferable the process however is carried out using good mixing extruder. The process parameter used and the specific design of the employed devices depend from the type of starting materials and the desired results and final products, but are known to the person skilled in the art.

The process in accordance with the present invention may be designed so that at least one compound having at least two carbonate units is either mixed, melted and reacted directly with the oligo- and/or (co-)polyamides to be processed or mixed with the already molten oligo- and/or (co-)polyamides to be processed or even during later stages of the process. It is furthermore possible to add the compound having at least two carbonate units either in pure form or in the form of a master batch. The required adaptations to the process are known to the person skilled in the art and offer the following advantages.

When mixing in the compound having at least two carbonate units directly at the start of the process a good intermixture is obtained. A later addition enables for example to mix further additional additive with the less viscous melt of the oligo- and/or (co-)polyamides. Only thereafter the condensation reaction and the therewith associated increase of the viscosity occurs, which however does not have a negative effect regarding the homogeneity of the dispersion of the additional additives. This is in particular advantageous when particulate fillers are to be incorporated.

If however glass fibers are to be incorporated it is preferable to add the at least one compound having at least two carbonate units simultaneously with the glass fibers to the already molten mixture. This secures that no excessive mechanical forces are imposed on the glass fibers, which could lead to the destruction of the fibers, and furthermore that a rapid but not overly accelerated condensation reaction is secured, so that the glass fibers may be dispersed evenly in the molten mass.

The metering of the additive in form of a master batch enables a more precise metering of the additive, since greater amounts are used. The master batch preferably comprises as matrix material the polyamide which is also used in the condensation process. This is however no limitation. The concentration of the additive in the master batch is preferably from 1 to 50 weight-%, more preferably from 5 to 25 weight-% and in particular preferably from 10 to 15 weight-%, based on the total weight of the master batch. The master batch furthermore may comprise additional further additives, such as those mentioned above. The preparation of the master batch is carried out as usual, i.e. as known to the skilled person.

It is preferred in the process according to the present invention to further employ in addition one di- and/or polyamine and/or an $NH_2$-terminated oligoamide having a molecular weight of less than 10000, preferably of from 2000 to 500. Preferably this compound is added prior to the addition of the compound having at least two carbonate units. The type of this compound is not limited; essential in this respect are the amino groups or the terminal $NH_2$ groups. Preferably this compound however is an oligoamide, corresponding in its structure to the polyamide to be produced. The addition amount of the di- and/or polyamine and/or $NH_2$-terminated oligoamide is from 0.1 to 10 weight-%, preferably from 1 to 3 weight-%, based on the amount of employed oligo- and/or (co-)polyamides. The addition of this specific compound leads here to a further improved condensation reaction.

Furthermore the present invention provides the use of at least one compound having at least two carbonate units for the condensation of oligo- and/or (co-)polyamides. Preferred embodiments for this use are apparent from the above.

Furthermore the present invention provides an additive for the condensation of oligo- and/or (co-)polyamides, comprising a structural element of the formula (I):

(I)

wherein P represents an oligo- or polyamide block, an oligo- or polyester block, an oligo- or polyether block, an oligo- or polyetheresteramide block, or an oligo- or polyesteramide block or mixtures or (block-) copolymers thereof. Examples and preferred embodiments are discussed above in connection with the process in accordance with the present invention.

$CE^1$ and $CE^2$ each represent one carbonate unit, which may be the same or different. L represents a linking group, selected among divalent groups and a single bond.

$CE^1$ and $CE^2$ are selected among carbonate units, which may be prepared on the basis of the following compounds:

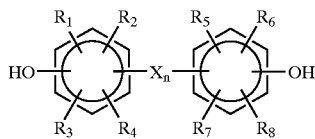

Wherein n is 0 or 1; X is —O—, —S—, —S—S—, —SO—, —$SO_2$—, —$SO_2$—$NR_{12}$—, —CO—, —CO—O—, —CO—NH—, —$CH_2$—, —$C(CH_3)_2$—, —$NR_9$—, —$C(CF_3)_2$— or —$CR_{10}R_{11}$—; $R_1$ to $R_8$ are selected independently among H, alkyl, or halogen; $R_9$ is H, alkyl or acyl; $R_{10}$ and $R_{11}$ may be connected to form a ring; and $R_{12}$ is alkyl or acyl.

The alkyl group preferably is a group having from one to six carbon atoms, in particular from 1 to 3 carbon atoms. These group may be optionally substituted. Preferred examples of substituents are halogens (Cl, Br, F, I) and alkoxy groups having from 1 to 3 carbon atoms.

The acyl group (—COR) is preferably an acyl group in which R is H, alkyl with from 1 to 5 carbon atoms or aryl. The aryl group is preferably an aryl group having from 6 to 24 carbon atoms. This group may optionally be substituted. Preferably the aryl group is a phenyl group. R is in particular preferably alkyl having from 1 to 3 carbon atoms. The ring formed by $R_{10}$ and $R_{11}$ may be a saturated or unsaturated ring with or without a heteroatom. Preferably the ring is a 3- to 12-membered ring, in particular a 5- to 8-membered ring. Further preferably this ring is a saturated ring without heteroatom. In particular preferred is a $C_6$ ring. The aryl group preferably is an aryl group having from 6 to 24 carbon atoms, which may optionally be substituted. Preferably the aryl group is a phenyl group.

Further preferred are carbonate units on the basis of dioxydiphenylalkanes, such as bisphenol A, bisphenol B, bisphenol F, halogenated biphenols, such as 3,3',5,5'-tetrachloro- or 3,3',5,5'-tetrabromo-bisphenol A, or alkylated bisphenols, such as 3,3',5,5'-tetramethyl-bisphenol A. In particular preferred are carbonate units on the basis of bisphenol A and bisphenol F. Preferably $CE^1$ and $CE^2$ are identical.

Examples of preferred divalent organic groups for L are —COO—, —CO—, —O—, —NR—. —NHCOO—, —NHCONH—, —N(COR)—, wherein R represents an alkyl or aryl group, —CONH— and —$(CH_2)_n$—, wherein n is from 1 to 5. Preferably L is —COO—.

The additive of the present invention is preferably used for the condensation of oligo- and/or (co-)polyamides, in particular in the process described above.

Preferably the additive of the invention comprises further an oligo- or polycarbonate block (PCB) linked to the structural element of formula (I) via $CE^2$.

(Ia)

Regarding the molecular weight of the blocks, their chemical nature and the constitution of the carbonate units it is referred to the above. The statements given above also apply here.

If the additive of the invention furthermore comprises and oligo- or polycarbonate block, the ratio of oligo- or polycarbonate block and P is in the range of from 99:1 to 5:95, preferable in the range of from 60:40 to 40:60 and in particular preferably in the range of 50:50, based on the weight. Preferably the additive of the invention is a compound in which P represents an oligo- or polyamide block and L represents —COO—. Further preferably the additive in addition comprises also an oligo- or polycarbonate block. The oligo- or polyamide block preferably is an oligo- or polyamide-6-block.

This preferred additive may be, contrary to the disclosure in the prior art, prepared by a reaction of a polyamide with COOH-groups with a polycarbonate. The preparation may for example be carried out using an extruder under the following reaction conditions.

A polycarbonate (PC) is melted (approx. 250 to 300° C.). A polyamide having COOH-groups (PA—COOH) is added to the melt. The weight ratio (PC) to (PA—COOH) is preferably from 10:90 to 90:10, more preferably from 30:70 to 70:30, in particular preferably from 55:45 to 45:55 and most preferably 50:50. The polyamide (PA—COOH) is melted and reacts with the polycarbonate (PC). The additive formed with this reactive blending process may be extruded, cooled, granulated and dried.

The obtained additive may be represented by the following formula

Since the unit PC', which originates from the used polycarbonate PC, comprises multiple carbonate units, the requirement of the present invention that at least two carbonate units are present is fulfilled. These are however not each shown, it is however obvious that the above given formula falls under formula (I). In formula (II) multiple polycarbonate blocks may be connected to the polyamide, since the polyamide having COOH groups may comprise some of these groups in the molecule. Preferable n in formula (II) is from 1 to 3, in particular preferably 2.

The employed polycarbonate in the above reaction may be any polycarbonate, preferably a polycarbonate derived from starting materials described in connection with $CE^1$ and $CE^2$. Preferably the polycarbonate is a condensation product of bisphenol A or bisphenol F. The polycarbonate preferably has a molecular weight of from 10000 to 30000, more preferably of from 18000 to 24000, most preferably of 20000.

As polyamide for the preparation of the additive any polyamide may be employed. Illustrative examples are described above. Preferably the polyamide is polyamide 6. The polyamide preferably has a molecular weight of from 5000 to 30000, more preferably of from 10000 to 20000 and most preferably of from 12000 to 17000. The introduction of COOH-groups into the polyamide may be secured using known methods. A polyamide may for example be reacted with an acid anhydride, such as trimellitic acid anhydride, or a free acid, such as adipic acid in the molten state. During the preparation of the additive of the invention it is possible to use common catalysts for transesterification. Examples thereof are sodium bisphenolate, potassium bisphenolate and the further usual compounds known to the person skilled in the art. This additive may be employed in pure form or in the form of a master batch. The devices and processes necessary therefor are known to the skilled person and given above.

The additive of the present invention may be in particular employed for the processing of polyamide 4.6. Polyamide 4.6 has, for polyamides, a relatively high melting point (>290° C.) and at the same time a rather small "window" for processing, i.e. for the processing only a narrow temperature range is available in which polyamide may be processed without degradation reactions. The required strict control of the processing parameters during processing is complicated and expensive. It has been found surprisingly that the processing "window" for polyamide 4.6 may be broadened significantly when using the additive of the present invention. Since the addition of the additive of the present invention does not influence the properties of polyamide 4.6 adversely it is possible to simplify the processing of polyamide 4.6. In this connection it should be mentioned that rather an improvement of the properties of the obtained material may be expected.

The present invention will b described further with the following examples.

EXAMPLE I

Preparation of an Additive of the Present Invention

I1: An additive of the present invention is prepared here using a two step procedure; the preparation may however also proceed in one step (see I.3).

Step 1: Preparation Of Polyamide 6 Having COOH-Groups
4 kg/h (through put) polyamide 6 were modified with 52 g/h (through put) trimellitic acid anhydride using a ZSK-30 twin screw extruder at 270° C. and 100 RPM. The modified polyamide having an average molecular weight of 15000 and having two terminal COOH-groups per molecule was extruded, cooled using a water bath, granulated and dried.

Step 2: Preparation of the Additive by Reactive Extrusion
2 kg/h polycarbonate (Lexan 141/tradename) was melted in the above described extruder at 280° C. 2 kg/h of the above prepared COOH-terminated polyamide were added thereto. The formed additive (in the following M1251) was extruded, cooled using a water bath, granulated and dried.

I.2: In the same manner further additive according to the present invention were prepared.

COOH-terminiertes PA 6 Polycarbonat Gewichtsverhältnis

| PA 6; Mw 15.000 | Lexan 141 | 50:50 (B4) |
| PA 6; Mw 10.000 | Lexan 141 | 50:50 (B5) |
| PA 6; Mw 5.000 | Lexan 141 | 70:30 (B6) |
| PA 6; Mw 5.000 | Lexan 141 | 50:50 (B7) |
| PA 6; Mw 5.000 | Lexan 141 | 30:70 (B8) |

I.3: A further additive of the present invention was prepared from the polyamide named under item I.1 and Lexan 141 (weight ratio 50:50) with the direct addition of adipic acid (B9) using a one step procedure. The process conditions were as described above for step 2.

EXAMPLE II

Condensation of PA 6 and PA 6.6
The following examples explored the dependency of the condensation reaction from various parameters. If not stated otherwise the experiments were carried out using a ZSK-30 twin screw extruder. The process conditions were the usual ones.

Dependency of the Condensation Reaction Concerning Additive Concentration

Polyamide 6 and polyamide 6.6 were modified using the above described double screw extruder provided with good mixing but less shearing screws. The through put was 8 kg/h. As comparison the extrusion of the pure polymer is given. As characterizing values the melt index and impact strength were determined. The results obtained are given in table 1.

TABLE 1

| PA 6 + % M1251 | KSZ [kJ/m$^2$] | MFI (290° C.; 2.16 g) [g/10 min] | PA 6.6 + x % M1251 | KSZ [kJ/m$^2$] | MFI (290° C.; 2.16 kg) [g/10 min] |
|---|---|---|---|---|---|
| 0.0 | 14.4 | 30 | 0.0 | 10.0 | 116 |
| 0.5 | 14.3 | 22 | 0.5 | 9.9 | 90 |
| 1.0 | 14.9 | 12 | 1.0 | 9.5 | 73 |
| 1.5 | 15.9 | 10 | 1.5 | 9.4 | 75 |
| 2.0 | 15.9 | 7 | 2.0 | 9.3 | 63 |
| 4.0 | 16.0 | 4 | 4.0 | 9.5 | 37 |
| 6.0 | 17.3 | 3 | | | |

KSZ: impact strength
MFI: melt flow index

The addition of the additive of the present invention during the condensation did show, even at only 0.5%, based on the polyamide, a significant condensation reaction, proven by the reduction of the melt flow index. With further increasing amounts of additive the melt index is further reduced, representing the further increase of the molecular weight. At the same time the impact strength increases, in particular when using polyamide 6. This represents a further additional positive effect.

Dependency of the Condensation Reaction from Processing Parameters

Polyamide 6 was modified using three different through puts, two different temperatures and two different screws (good mixing and less shearing [screw A] and good mixing and stronger shearing [screw B]). The additive concentration (M1251) was 1%. As comparison the corresponding experiments without additive are given. As characteristic values the impact strength and the melt index were determined. The results obtained are given in table 2. The varying of the through put, in these experiments, represents a variation of the reaction time, since with higher through puts the residence time is reduced, which reduces the available time for reaction.

TABLE 2

| Through put [kg/h] | MFI PA6 | MFI PA6 + 1% M1251 | KSZ PA6 | KSZ PA6 + 1% M1251 |
|---|---|---|---|---|
| Screw B Temperature 280° C. | | | | |
| 4 | 33 | 15 | 14,8 | 16,8 |
| 6 | 33 | 16 | 15,8 | 17,1 |
| 8 | 32 | 13 | 16,8 | 17,4 |
| Screw B Temperature 250° C. | | | | |
| 4 | 32 | 13 | 14,8 | 17,4 |
| 6 | 32 | 14 | 15,8 | 17,6 |
| 8 | 31 | 12 | 16,8 | 17,8 |
| Screw A Temperature 280° C. | | | | |
| 4 | 33 | 12 | 14,8 | 16,3 |
| 6 | 32 | 13 | 15,8 | 16,6 |
| 8 | 32 | 14 | 16,8 | 17,7 |
| Screw A Temperature 250° C. | | | | |
| 4 | 32 | 14 | 14,8 | 16,3 |
| 6 | 33 | 13 | 15,8 | 16,1 |
| 8 | 30 | 12 | 16,8 | 14,9 |

MFI and KSZ as in Table 1

These results demonstrate that the additive of the present invention may be employed successfully over a broad processing "window" for the condensation of polyamides. The processing parameters do not play a significant role.

This enables in particular the use of the additive without expensive amendments for processing devices, such as extruder.

At the same time it was shown that the additive of the present invention enables a rapid condensation reaction, since evem with the highest through put a significant increase of the molecular weight could be obtained. Inhomogeneities, such as gel formation did not occur, as shown with the results of the determination of the solution viscosity and the impact strength. Inhomogeneous samples would display deteriorated values. This furthermore shows that the additive of the present invention does not influence the final product with respect to the addition site of the additive.

Influence of Multiple Processing Upon Polyamides Obtained with the Condensation Process Polyamide 6, in dry as well as in moist form, was extruded with and without addition of additive. As characterizing values melt index and impact strength were determined. The results obtained are given in table 3. The extrusion was carried out using the above described extruder.

Stable product properties, in particular concerning MFI, upon multiple processing, are important for the use of the obtained polyamides in technical fields where a lot of polymer waste in pure form occurs. This waste should be preferably reprocessed without complicated intermediate steps, in order to save costs and resources.

TABLE 3

| Polyamide 6 Extrusion | MFI | KSZ |
|---|---|---|
| | dried | without additive |
| 1. | 33 | 14.8 |
| 2. | 33 | 14.0 |
| 3. | 30 | 14.2 |
| 4. | 31 | 13.8 |
| 5. | 33 | 13.8 |
| | dried | +1% M1251 |
| 1. | 11 | 15.6 |
| 2. | 13 | 15.5 |
| 3. | 15 | 14.7 |
| 4. | 16 | 14.2 |
| 5. | 19 | 14.1 |
| | Not dried | +1% M1251 |
| 1. | 13 | 15.8 |
| 2. | 14 | 15.3 |
| 3. | 16 | 14.9 |
| | dried | +1% B8 |
| 1. | 15 | 16.3 |
| 2. | 11 | 16.0 |
| 3. | 11 | 15.5 |
| 4. | 13 | 14.9 |
| 5. | 14 | 15.1 |

MFI and KSZ as in Table 1

The experiment using not dried polyamide 6 without additive is not shown since this experiment gave the expected result, decrease of impact strength and increase of melt index.

The experiment using dried polyamide without additive shows that thoroughly dried polyamide may be extruded several times. Such a drying however is technically very complicated and requires higher costs for energy. At the same time costs arise for the provision of drying equipment.

The experiments in accordance with the present invention, in particular the experiment using additive B, show that a stable condensation is obtained. The good characterizing values vary upon multiple extrusion only in a tolerable range and remain stable within the desired range. Even the processing of not dried polyamide can yield a good condensation. Multiple extrusion does not lead to a non acceptable decrease of impact strength. This value is, after three extrusions still better that the value for pure polyamide after just one extrusion.

Influence of the Additive Composition Upon the Condensation Reaction

Polyamide 6 (Miramid PA 6; trade name) was modified using the various additives of I.1 and I.2 (process conditions as during the evaluation of the influence of the additive concentration). The results of the determination of the melt index and the impact strength are given in table 4.

TABLE 4

| Composition | MFI | KSZ |
|---|---|---|
| Pa 6 | 27 | 14.4 |
| PA 6 + 1% B4 | 10 | 13.9 |
| PA 6 + 1% B5 | 11 | 13.8 |
| PA 6 + 1% B6 | 15 | 13.7 |
| PA 6 + 1% B7 | 13 | 14.1 |
| PA 6 + 1% B8 | 8 | 14.1 |
| PA 6 + 1% B9 | 10 | 15.1 |

MFI and KSZ as in table 1

The results do show the efficacy of the additives of the present invention. In particular additive B8, due to the high carbonate content, is a cost effective variant. Additive B9 further demonstrates that additives obtained in a one step procedure may be successfully employed for the condensation reaction.

Influence of Glass Fibers, Processing Aids, Processing Stabilizers and Antioxidants Upon the Condensation Reaction Polyamide 6 (as employed in the previous experiments) was compounded with various further additives and without additive of the invention, with additive of the invention and with one additive for condensation of the prior art. As characterizing values the melt index (MFI), the bending strength (BF), the b-value in the CIEL ab system (b) and impact strength according to charpy (SZC) were detremined. The results obtained are shown in the following table. The addition of all the additives occurred at the beginning if not stated otherwise. The determination of the impact strength according to charpy and of the b-value in the CIEL ab system were carried out in accordance with the normed regulations therefor.

TABLE 5

| Composition {number of experiment} | SZC [kJ/m$^2$] | BF [N/mm$^2$] | MFI (270° C.;5 kg) [g/10 min] | b |
|---|---|---|---|---|
| {1} PA6 + 30% GF(A) + 0.3% VAH | 59 | 225 | 60/57 | −0.2 |
| {2} PA6 + 30% GF(A) + 0.3% VAH + 1.0% M1251 | 63 | 214 | 41/38 | 1.2 |
| {3} PA6 + 30% GF(A) + 0.3% VAH + 0.2% VAS + 1.0% M1251 | 61 | 246 | 27/23 | 2.4 |
| {4} PA6 + 30% GF(A) + 0.3% VAH + 0.2% AX + 1% M1251 | 61 | 240 | 19/20 | 3.1 |
| {5} PA6 + 30% GF(A) + 0.3% VAH + 0.5% VA | 63 | 232 | 29/27 | −0.4 |
| {6} PA6 + 30% GF(B) + 0.3% VAH | 55 | 227 | 46/46 | −0.6 |
| {7} PA6 + 30% GF(B) + 0.3% VAH + 1% M1251 | 56 | 226 | 26/26 | 1.4 |
| {8} PA6 + 30% GF(B) + 0.3% VAH + 0.5% VA | 55 | 218 | 31/27 | 1.0 |
| {9} PA6 + 30% GF(A) + 0.3% VAH + 1% M1251 (#) | 67 | 237 | 18/19 | 2.1 |
| {10} PA6 + 30% GF(B) + 0.3% VAH + 5% M1251 | | | 22/22 | |

GF(A): glass staple fibers of Owns Corning
GF(B): glass staple fibers of Glasseiden GmbH Oschatz
VAH: montanate (processing aid)
VAS: phosphonate (processing stabilizer)
AX: mixture of phosphite and sterically hindered phenolic antioxidant
VA: additive having just one carbonate unit
(#): addition of additive occurred at the time of the addition of the glass fibers The experiments in accordance with the present invention {2} to {4}, {7}, {9} and {10} demonstrate that the additive of the present invention enables a successful condensation reaction even in the presence of further additional additives. Neither glass fibers nor processing aids or antioxidants lead to a deterioration of the reaction. To the contrary, using the further additive H175 lead to an increased condensation reaction, a fact which can only be explained if a surprising synergism is taken into account.

The b-values show that the additive of the present invention only gives raise to a very slight yellowing, which still is within an acceptable range (increasing positiv b-value means an increase of the yellowing). The experiments without additive of the invention show in this respect the expected high MFI, i.e. the condensation reaction only took place to a minor amount. The experiments using an additive for the condensation of the prior art do show acceptable values, however, the handling of the experiments was difficult. With this additive a condensation in the presence of AX and VAY was only possible with increased amounts of additive, since adverse side reactions occurred.

Experiment {9} demonstrates that the processing in accordance with the present invention may also be successfully completed if the additive is added at a later stage together with the glass fibers. The condensation reaction is very good and also the impact strength according to charpy is excellent.

Condensation Reactions Using Additive of the Present Invention with Only a Few Carbonate Units Synthesis of Additive OC I:

0.3 mol (64.3 g) diphenylcarbonate (DCP) were stirred with 0.2 mol (46.7 g) bisphenol A and a minor amount of zinc acetylacatonate (as catalyst) under nitrogen at 240° C. for 4 hours. The generated phenol was distilled off. The obtained solid product was an oligocarbonate having in average three carbonate units.

Synthesis of additive OC II:

0.3 mol (64.3 g) diphenylcarbonate (DCP) were stirred with 0.2 mol (18 g) 1,4-butamediol and a minor amount of zinc acetylacatonate (as catalyst) under nitrogen at 180° C. for 4 hours and than at 220° C. for one hour. The generated phenol was distilled off. The obtained oily product was an oligocarbonate having in average three carbonate units.

The prepared additives OC I and OC II were used in laboratory scale experiments for the condensation of polyamide 6 using a kneader. The results are shown in table 6.

TABLE 6

| Polymer | Additive | torque [Nm] |
|---|---|---|
| 50 g PA-6 | without | 1.8 Nm |
| 50 g PA-6 | OC I 0.5 g = 1 Ma.-% | 3.5 Nm |
| 50 g PA-6 | OC I 1 g = 2 Ma.-% | 8.0 Nm |
| 50 g PA-6 | OC I 2 g = 4 Ma.-% | 14.0 Nm |
| 50 g PA-6 | OC II 0.6 g = 1.2 Ma.-% | 3.5 Nm |
| 50 g PA-6 | OC II 1.1 g = 2.2 Ma.-% | 7.4 Nm |

Conditions:
Haake-laboratory kneader, electrically heated chamber
50 g PA-6; 250° C.; 80 RPM
OC I - addition as solid
OC II - addition as liquid (weighting of the dropping funnel) Reaction not so fast The values for torque shown in the table demonstrate that additives used in accordance with the present invention with only few carbonate units may be employed successfully for condensation reactions. The obtained increase of the values for the torque show that a condensation takes place.

EXAMPLE III

Compatibilisation of Polycarbonate/Polyamide 6-Blends

Polyamide 6 (ultramid type) was processed together with polycarbonate (lexan type) using a Haake double screw extruder provided with a specific screw for compounding (diameter 16 mm). The through put was 2 kg/h and the additive named in table 7 (additive B5: polyamide 6 polycarbonate block copolymer of example 1) was used in the amount given in table 7. As comparison pure polycarbonate was used. The products were, after granulation immedeately dried under vacuum conditions at 90° C. so that no water could be taken up by the polyamide. Moldings were prepared using injection molding techniques. The moldings were tested under injection molding dry conditions with respect to tensile strength and E module. The results are shown in table 7.

TABLE 7

| material | Tensile strength [MPa] | E-Module [MPa] |
|---|---|---|
| 100 wt.-% PC + 0 wt.-% B5 | 61.2 | 2210 |
| 100 wt.-% PC + 2 wt.-% B5 | 57.3 | 2228 |
| 100 wt.-% PC + 4 wt.-% B5 | 56.4 | 2260 |
| 100 wt.-% PC + 6 wt.-% B5 | 56.0 | 2260 |
| 80 wt.-% PC/20 wt.-% PA 6 + 0 wt.-% B5 | 48.8 | 2310 |
| 80 wt.-% PC/20 wt.-% PA 6 + 2 wt.-% B5 | 62.3 | 2260 |
| 80 wt.-% PC/20 wt.-% PA 6 + 4 wt.-% B5 | 61.6 | 2240 |
| 80 wt.-% PC/20 wt.-% PA 6 + 6 wt.-% B5 | 63.4 | 2260 |

Further the melt flow index (MFI) was tested. The results are shown in table 8.

TABLE 8

| Material | MFI 280° C., 2.16 kg) [g/10 min] |
|---|---|
| 100 wt.-% PC + 0 wt.-% B5 | 13.1 |
| 100 wt.-% PC + 2 wt.-% B5 | 15.4 |
| 100 wt.-% PC + 4 wt.-% B5 | 15.6 |
| 100 wt.-% PC + 6 wt.-% B5 | 16.7 |
| 80 wt.-% PC/20 wt.-% PA 6 + 0 wt.-% B5 | 18.1 |
| 80 wt.-% PC/20 wt.-% PA 6 + 2 wt.-% B5 | 29.8 |
| 60 wt.-% PC/40 wt.-% PA 6 + 0 wt.-% B5 | 12.1 |
| 60 wt.-% PC/40 wt.-% PA 6 + 2 wt.-% B5 | 16.2 |

The obtained results show that an excellent compatibilisation was obtained.

What is claimed is:

1. An additive for the condensation of oligo- and/or (co-)polyamides, comprising at least one structural element of formula (II):

$$PA-(-COO-PC')_{n \geq 1} \quad (II)$$

wherein PA represents a polyamide block and PC' represents a polycarbonate block, obtained by reactive extrusion of a polycarbonate with a COOH-terminated polyamide, wherein n is 1 to 3, and
wherein said polycarbonate block is a condensation product of bisphenol A or bisphenol F.

2. The additive according to claim 1, wherein n is 2.

3. The additive according to claim 1, wherein said polycarbonate block has a molecular weight from 10,000 to 30,000.

4. The additive according to claim 1, wherein said polycarbonate block has a molecular weight from 18,000 to 24,000.

5. The additive according to claim 1, wherein said polycarbonate block has a molecular weight of 20,000.

6. The additive according to claim 1, wherein said polyamide block is polyamide 6.

7. The additive according to claim 1, wherein said polyamide block has a molecular weight from 5,000 to 30,000.

8. The additive according to claim 1, wherein said polyamide block has a molecular weight from 10,000 to 20,000.

9. The additive according to claim 1, wherein said polyamide block has a molecular weight from 12,000 to 17,000.

10. An additive for the condensation of oligo- and/or (co-)polyamides, comprising at least one structural element of formula (II):

$$PA-(-COO-PC')_{n \geq 1} \quad (II)$$

wherein PA represents a polyamide block and PC' represents a polycarbonate block, obtained by reactive extrusion of a polycarbonate with a COOH-terminated polyamide, wherein n is 1 to 3, and
wherein said polycarbonate block has a molecular weight from 10,000 to 30,000.

11. The additive according to claim 10, wherein n is 2.

12. The additive according to claim 10, wherein said polycarbonate block is a condensation product of bisphenol A or bisphenol F.

13. The additive according to claim 10, wherein said polycarbonate block has a molecular weight from 18,000 to 24,000.

14. The additive according to claim 10, wherein said polycarbonate block has a molecular weight of 20,000.

15. The additive according to claim 10, wherein said polyamide block is polyamide 6.

16. The additive according to claim 10, wherein said polyamide block has a molecular weight from 5,000 to 30,000.

17. The additive according to claim 10, wherein said polyamide block has a molecular weight from 10,000 to 20,000.

18. The additive according to claim 10, wherein said polyamide block has a molecular weight from 12,000 to 17,000.

* * * * *